United States Patent [19]
Martin et al.

[11] 3,915,109
[45] Oct. 28, 1975

[54] PHASE SENSING SYSTEM FOR USE WITH A SHIP STABILIZATION APPARATUS

[75] Inventors: John P. Martin, Montclair; Eugene Walsh, Edison, both of N.J.

[73] Assignee: Flume Stabilization Systems, Inc., Hoboken, N.J.

[22] Filed: Jan. 15, 1974

[21] Appl. No.: 433,449

[52] U.S. Cl. .......... 114/125; 114/122; 318/585; 318/588; 324/83 A; 340/248 A
[51] Int. Cl.² ........................................ B63B 43/06
[58] Field of Search ........... 114/121, 122, 125, 126; 235/150.2; 244/77 R, 77 E; 307/232; 318/585, 588, 608, 642, 644, 683; 324/83 R, 83 A; 328/133, 146, 155; 340/29, 56, 170, 248 A, 253 Y

[56] References Cited
UNITED STATES PATENTS

| | | | |
|---|---|---|---|
| 3,521,593 | 7/1970 | Pangalila | 114/125 |
| 3,657,659 | 4/1972 | Johnson | 307/232 X |
| 3,735,150 | 5/1973 | Harris | 307/232 |
| 3,755,801 | 8/1973 | Milo | 340/248 A X |
| 3,805,153 | 4/1974 | Gallant | 328/133 X |

Primary Examiner—Trygve M. Blix
Assistant Examiner—Stephen G. Kunin
Attorney, Agent, or Firm—Fleit & Jacobson

[57] ABSTRACT

A phase sensing system is provided for use with a ship stabilization apparatus whereby the movement of fluid within a stabilization tank is compared with information relating to the roll of the ship to provide an indication of the condition of the fluid level within the stabilization tank and whether adjustment of the fluid level within the tank is necessary to optimize the stabilization effect.

19 Claims, 12 Drawing Figures

Fig. 2a
Fig. 2b
Fig. 2c
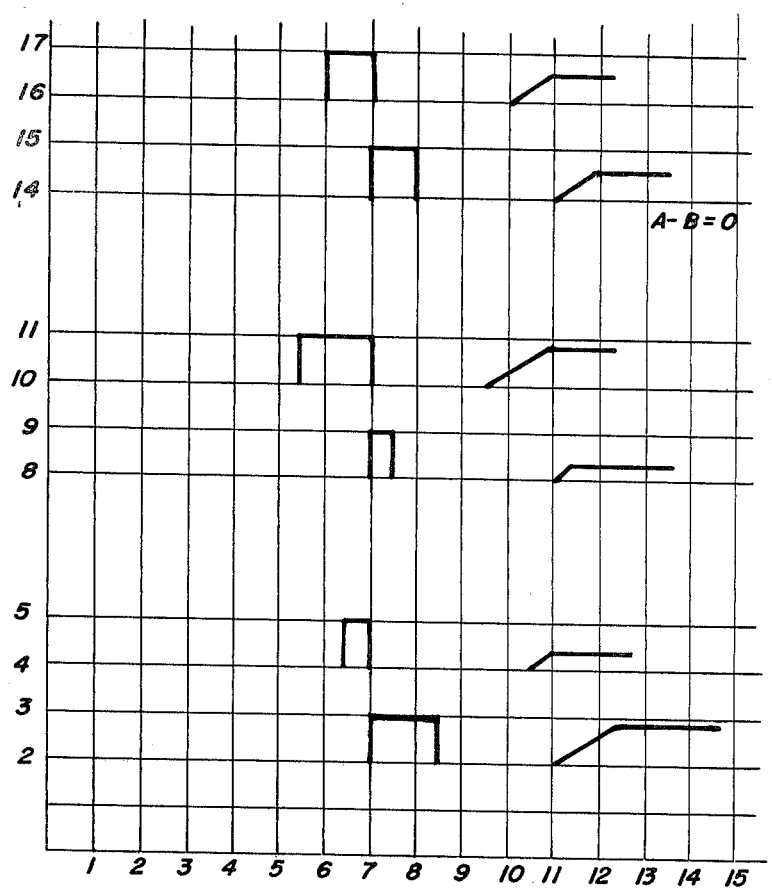
Fig. 3
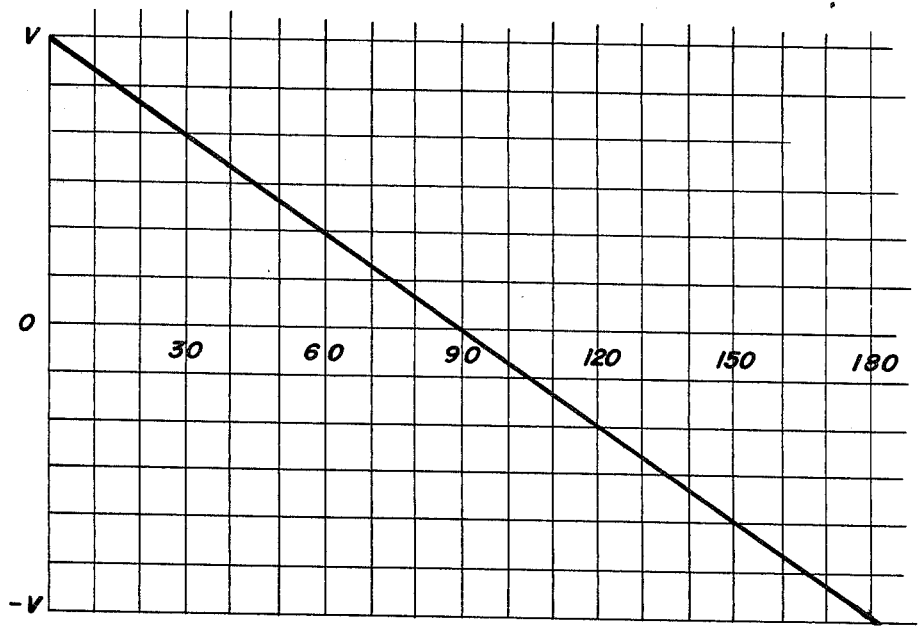

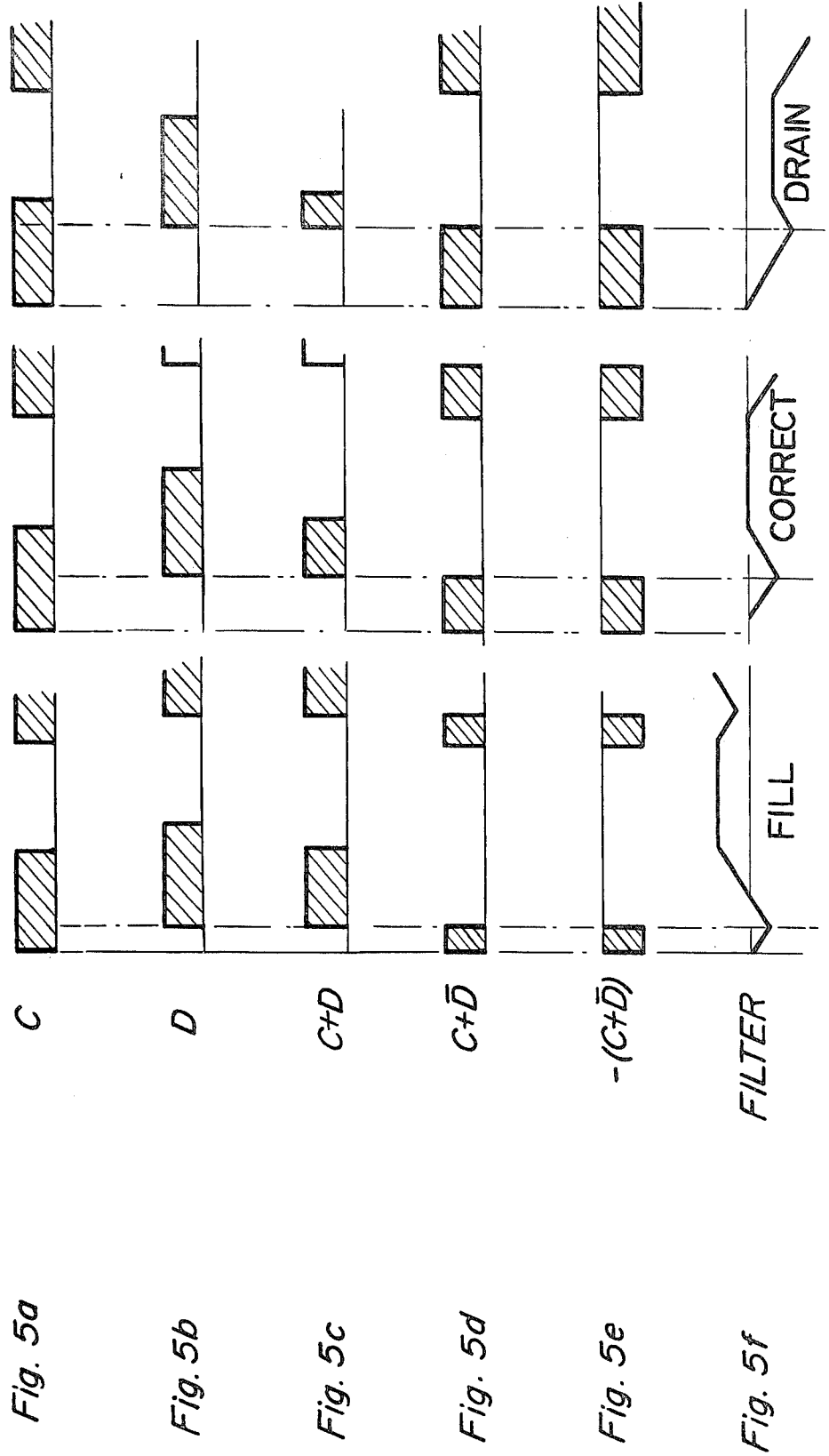

PHASE SENSING SYSTEM FOR USE WITH A SHIP STABILIZATION APPARATUS

This invention relates to phase sensing systems and more particularly to a phase sensing system for use with a ship stabilization apparatus for indicating the optimum level of fluid to be maintained within a stabilization tank. In particular, this invention relates to novel circuitry particularly useful for carrying out the invention described and claimed in U.S. Pat. No. 3,521,593, issued on July 21, 1970, and assigned to the present assignee.

Numerous types of active and passive ship stabilization systems have been devised. Among these systems are those which rely upon the out-of-phase movement of fluid within a stabilization tank to stabilize the ship and counteract its tendency to roll.

A primary object of the present invention is to provide a phase sensing system for use with such a ship stabilization apparatus whereby the phase difference between the movement of fluid within the stabilization tank and the roll of the ship is utilized to indicate the level of fluid to be maintained within the tank to provide for optimum ship stabilization.

Additional objects and advantages of the invention will be set forth in part in the description which follows, and in part will be apparent from the description, or may be readily learned by practice of the invention. The objects and advantages are realized and attained by means of the instrumentalities and combinations particularly pointed out in the appended claims.

To achieve these and other objects, the present invention provides a phase sensing system for use with a ship stabilization tank and apparatus, including tank sensing means operatively associated with the stabilization tank for sensing information relating to movement of fluid within the tank. Ship sensing means in operative relationship with the ship for providing information concerning movement of the ship, indicating means for displaying whether the level of fluid within the tank requires adjustment to maintain the desired condition of ship stabilization, additional sensing means in operative relationship with the tank sensing means and the ship sensing means for determining additional information from the fluid movement information and from the ship movement information, and comparator means operatively associated with the indicating means and the additional sensing means for comparing the additional information with predetermined information to provide information for updating the indicating means.

In accordance with the invention, delay means are also provided for only periodically permitting the updating of the indicating means as determined by a predetermined number of increments of the updating information, whereby transient stabilization conditions are prevented from causing erroneous updating information to be displayed by the indicating means. The invention also provides resetting means for periodically returning the additional sensing means to a predetermined starting condition. It should be understood that while such delaying and resetting mechanisms are highly effective, they serve principally to augment the basic circuitry of the present invention.

As here embodied, the ship movement information is preferably roll information and the additional information is information relating to the phase difference between the fluid movement information and the ship movement information.

Preferably, each of the sensing means comprises a pair of pressure sensors positioned within the tank and located beneath the surface of the fluid, with one of the pressure sensors being positioned adjacent one end of the tank and the other of the sensors being positioned adjacent the opposite end of the tank (athwartship). The means for providing information concerning movement of the ship is preferably a vertical gyro positioned to provide roll information. However, any suitable alternate devices such as roll rate gyros, damped pendulums or other known means may be used for determining the motion of the ship.

The invention provides an effective and efficient electronic system for determining the phase difference between the movement of fluid within a stabilization tank and roll of the ship. This information is used to display to shipboard personnel information regarding whether the fluid level is that desired for optimum ship stability. Furthermore, the liquid level can be automatically adjusted to optimum by using the sensed information to directly control the liquid pumping mechanisms.

It is to be understood, of course, that both the foregoing general description and the following detailed description are exemplary and explanatory and are not restrictive of the invention.

The accompanying drawings illustrate an example of a preferred embodiment of the invention, and together with the description, serve to explain the principles of the invention.

FIG. 2 is a graphical illustration of signal values at various locations within the system;

FIG. 3 is a graphical illustration of the response curve of a phase detector within the system;

FIG. 5 is a graphical illustration of the response curve of the partial circuit illustrated in FIG. 4.

The phase sensing system described herein enables shipboard personnel to quickly determine the fluid level within a stabilization tank, relative to optimum, and to determine whether it is necessary to add or subtract fluid from the tank to achieve optimum stabilization of the ship. A display panel is provided at a suitable location, such as on the bridge, for displaying information in the form of instructions to raise or lower the level of fluid within the tank or to maintain the fluid at its existing level. The fluid level will be maintained if the phase angle between movement of the ship and movement of the fluid within the tank is within the preset limits.

The phase sensing system compares the motion of the ship and the transfer or movement of liquid within the stabilization tank and determines the phase difference between the two. It is this phase information that is utilized to indicate whether the optimum fluid level is being maintained within the tank.

Figure 1:
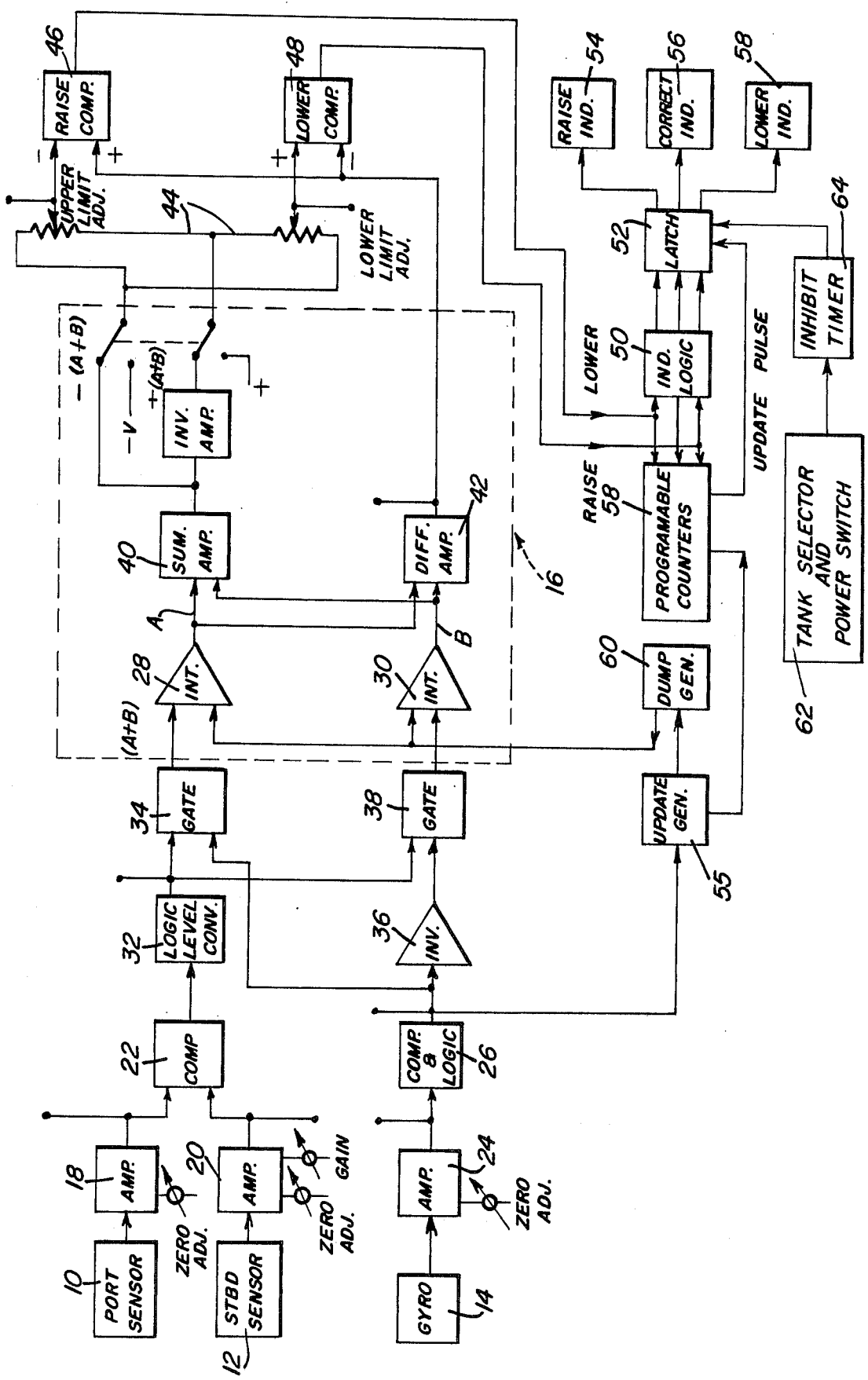
FIG. 1 is a functional block diagram view of the phase sensing system.

With reference now to FIG. 1, there is shown a port sensor 10 and starboard sensor 12 positioned within a stabilization tank (not shown) and beneath the surface of the fluid within the tank. These sensors may be differential pressure sensors, for example, but any type of sensing apparatus may be utilized that is capable of providing the desired fluid transfer information.

In accordance with a preferred embodiment of this invention, means are also provided in operative relationship with the ship for providing information concerning movement of the ship. As here embodied, the means for providing information concerning movement of the ship is a vertical gyro 14 which is preferably adapted to detect and provide information concerning roll of the ship.

Additional phase detector means are also provided in operative relationship with the port and starboard sensors and with the gyro for providing phase information as derived from the fluid movement and from movement of the ship. As here embodied, the additional phase detector means comprises first circuit means, including amplifiers 18, 20 and comparator 22, in circuit with port sensor 10 and starboard sensor 12, respectively.

The output signals from the port and starboard sensors located within the stabilization tank (not shown) are fed to amplifiers 18 and 20 and are introduced into comparator 22. Comparator 22, in turn, provides first signals of predetermined characteristics as determined by the relative levels of fluid in the respective ends of the stabilization tank. Preferably, the first signals are square wave signals of positive amplitude when the port level of the fluid within the tank is higher than the starboard level, and of zero amplitude when the starboard level of the fluid within the tank is higher. The polarities of these signals are of course arbitrary as any combination will contain the necessary phase information. An adjustment of the connection to the phase detectors will bring about any desired polarity reversal. The square wave output of comparator 22 is then used to operate the integrator portion of phase detector 16 as will be described in full, infra.

The phase detector 16 connects to second circuit means in circuit with the ship movement information providing means for amplifying output signals from the providing means and for generating second signals of predetermined characteristics as determined by the movement of the ship. As here embodied, the second circuit means includes amplifier 24 and comparator and logic circuit 26.

Gyro 14 is preferably provided with a potentiometer output (not shown), although a synchro output or any other output signal proportional to the ship's motion may be used. The gyro signal is amplified by amplifier 24 and converted to a square wave by comparator and logic circuit 26. The square wave is characterized by a positive voltage signal for port roll of the ship and by a zero volt signal for starboard roll. These square wave signals are, in turn, used to operate phase detector 16. Again, the polarities are arbitrary, and determine the connection of the phase detector scheme.

The square wave signals from comparators 22 and 26 are applied to phase detector 16, and the phase lag between the roll of the ship and the movement of fluid within the stabilization tank during each roll cycle is computed, compared with preset limits, and the result (high, low, or correct) is applied to indicator circuits.

Phase detector 16 operates on a roll-cycle-by-cycle basis and provides an output proportional to the phase lag of the fluid transfer signal in relation to ship roll as generated by comparator 22. An alternate detector, which provides an analog output proportional to a long time average of phase displacement, may also be used. First and second integrator circuits 28 and 30 are controlled by the phase relationships between the transfer signals from comparator 22 and the gyro signals from comparator circuit 26. Logic circuits 32 and 34 are in circuit with first integrator circuit 28 and with comparator 22 for controlling the operation of integrator circuit 28, and logic circuits 36 and 38 are in circuit with second integrator circuit 30 and with comparator and logic circuit 26 for controlling the operation of second integrator circuit 30.

The first or transfer information signals from comparator 22 and the second or gyro signals from comparator and logic circuit 26 are applied to logic circuits 32, 34, and 36, 38, respectively, and it is circuits 32, 34, 36 and 38, together with comparator 22 and comparator and logic circuit 26, which determine the duration of each integration by integrators 28 and 30. Accordingly, at the end of a roll cycle of the ship, the output voltage from each of integrators 28 and 30 is directly proportional to the length of time that those integrators are activated.

As here embodied, the additional or phase detector means further includes means 40 in circuit with integrator circuits 28 and 30 for summing the outputs of the integrator circuits, and means 42 in circuit with integrator circuits 28 and 30 for providing a signal representative of the difference between the outputs of integrators 28 and 30.

Means are also operatively associated with the indicating means and with the additional phase detecting means for comparing the phase detector information with predetermined information to provide information for updating the indicating means. As here embodied, the comparing means comprise voltage divider 44 in circuit with summing amplifier 40 for providing a signal which is a multiple of the summed outputs of integrator circuits 28 and 30. In addition, a first comparator 46 and a second comparator 48 are in circuit with voltage divider 44 for comparing the difference between the outputs of integrator circuits 28 and 30 with the multiple of the summed outputs to provide output signals from comparators 46 and 48 to the indicating means relating to the level of fluid in the stabilization tank.

The indicating means of the system is provided for displaying information concerning the fluid level in the stabilization tank, and the indicating means include a logic circuit 50 coupled in circuit with comparators 46 and 48. A memory register or latch 52 is connected in circuit with logic circuit 50 for storing information from comparators 46 and 48, and indicators 54, 56 and 58 are located in circuit with memory register 52 for displaying information relating to the level of fluid in the stabilization tank.

The system of this invention also provides means in operative relationship for only periodically permitting updating of the indicating means as determined by a predetermined number of increments of updating information, whereby transient stabilization conditions are prevented from causing erroneous updating information to be displayed by the indicating means.

As here embodied, the means for periodically permitting updating of the indicating means preferably includes a first generator in circuit with phase detector 16 for providing an output signal relating to the movement of the ship and counter means 58 in circuit with generator 55 and with memory register 52 for detecting output signals for the first generator and for periodically providing an output signal to memory register 52 to enable the updating information from comparators 46 and 48 to be displayed by indicators 54, 56, or 58, as appropriate.

In accordance with the invention, means are also provided in operative relationship for periodically returning the phase detector means to a predetermined starting condition. As here embodied, this means includes a second generator 60 in circuit with phase detector 16 and with first generator 55 for periodically placing integrators 28 and 30 in their "zero" conditions prior to the beginning of a new roll cycle.

Operation of the phase sensing system of the invention will be best understood with reference to FIGS. 1 and 2. As an example, with a phase lag between the fluid movement within the tank and roll of the ship of 90°, the outputs of integrators 28 and 30 are equal. This is best illustrated in FIG. 2a, wherein A represents the signal output from integrator 28 and wherein B represents the signal output from integrator 30.

As the phase angle deviates from 90°, the integration times during which integrators 28 and 30 are operative become unequal and provide a means of measuring the deviation or phase lag. Phase lag is measured by the sum and difference of the two integrator outputs and is equal to 90 (1 − A−B/A+B ), where A and B are the stored output levels of the integrators at the end of each roll cycle.

Considering a phase lag of 45°, integrator 28 operates for a longer time period than does integrator 30 so that the output of integrator 28 is larger than that of integrator 30 and A−B is a positive quantity. Conversely, when the phase lag is 135°, for example, the output of integrator 30 is larger than that of integrator 28 and A−B is a negative value. A typical phase detector response is illustrated in graphical form in FIG. 3.

The outputs from integrators 28 and 30 are then applied to summing amplifier 40 and to differential amplifier 42 in order to obtain the A+B and A−B voltage values. The integrators are returned to zero at the end of each roll cycle by means of a signal from dump generator 60.

The output from phase detector 16 is compared with preset limits to determine the status of the fluid level within the stabilization tank. Voltage divider 44 is used to scale the A+B signal by a factor ($x$) dependent upon the limit setting, where $x = 1 - $(Phase limit/90). Comparators 46 and 48 are then used to compare the difference (A-B) with the divider output [$x$(A+B)] as follows:

Lower Limit

If A−B > $x$(A+B), a LOWER signal is generated.
If A−B < $x$(A+B), no signal is generated.

Upper limit

If A−B > $x$(A+B), no signal is generated.
If A−B < $x$(A+B), a RAISE signal is generated.

If, for example, the lower limit of phase lag was desired to be 45°, the lower limit divider 44 would be set for 0.5(A+B). Whenever (A−B) is greater than 0.5(A+B) a "lower" signal is applied to the indicator logic 50 and to "lower" indicator 58. The upper and lower limit settings on divider 44 are independent of each other, and either can be set over the range from 0° to 180°. It should again be stressed that these settings, ranges, etc. are given only by way of example. Numerous other combinations may be applied without in any way departing from the spirit or scope of the present invention.

The indicator means, thus, provides a "lower" indication on indicator 58 when the lower phase limit is exceeded, a "raise" indication on indicator 54 when the upper phase limit is exceeded and a "correct" indication on indicator 56 when neither condition exists and when the fluid level within the stabilization tank is at the desired or optimum level or within the desired range.

Because, in the specific example given, meaningful information from comparators 46 and 48 is obtained only at the end of each roll cycle, the information is preferably stored in memory register or latch 52, and updated by sampling, for example, each time the ship rolls to port. Indicators 54, 56 and 58, therefore, are only changed during their short sampling time period that occurs as each roll cycle begins. However, in order to prevent erroneous information from being transferred to the indicators during anomolous or aperiodic roll cycles, a programmable counter or counters 58 are provided to inhibit the update pulse from generator 55 until a preset number of consecutive indications is obtained from comparators 46 and 48. This prevents changing indications during non-resonant or abrupt non-uniform rolls that may occur at uneven intervals.

As can be seen in FIG. 1, the inventive circuit also includes at 62, a power switch and, if more than one tank is provided on a ship, a tank selection switch. An inhibit timer 64 also forms a part of the inventive circuitry and serves to enable the memory register or latch 52 only periodically so as to avoid spurious indications of tank conditions due to transient impulses.

Figure 4:
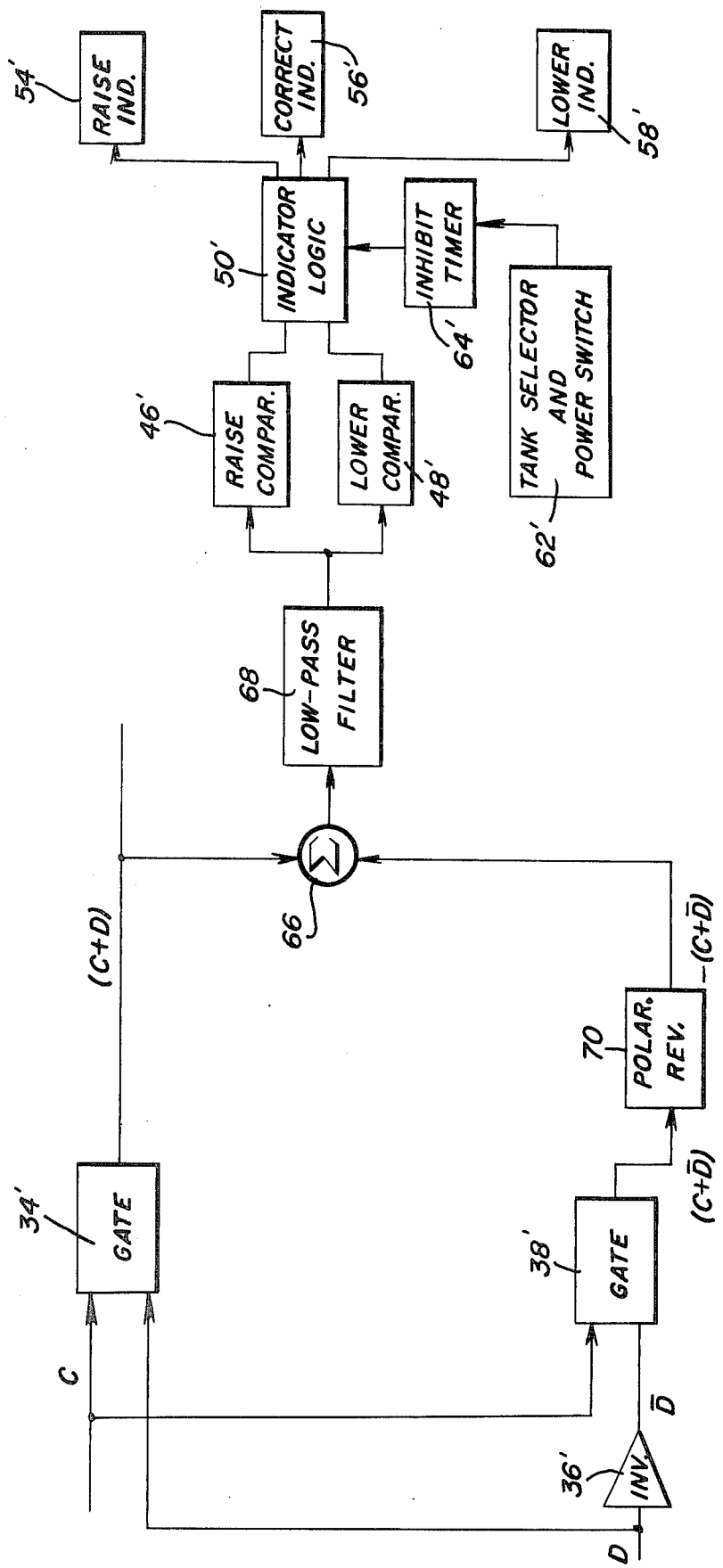
FIG. 4 is a partial block diagram view of another embodiment of the present invention, using a low-pass filter to eliminate the latching and updating circuitry described with reference to FIGS. 1 and 2.

With reference now to FIGS. 4 and 5, a second embodiment of the present invention will be described. FIG. 4 illustrates only a partial block diagram, as the remainder of the circuit in advance of gates 34' and 38' has already been described with reference to FIG. 1. As can be seen, however, the circuit of FIG. 4 differs from that of FIG. 1 in that it includes a simple summing network 66 and a low-pass filter 68 instead of the complex latching and up-dating circuitry.

In FIG. 4, the voltage pulse which is indicated by C is that pulse produced by logic circuit 32' (32 in FIG. 1), while the pulse represented by D derives from logic circuit 26' (26 in FIG. 1). The output of gate 34' takes the form of signal C + D while gate 38' delivers a signal C + D, the pulse D first having been inverted by an inverter 36'. The output signal of gate 38' is fed to a polarity reversing circuit 70 which, as indicated, emits a signal equal but opposite in polarity from that generated by its input gate.

The respective output signals from gate 34' and polarity reversing circuit 70 are fed to and are algebraically added together by a summing network 66. Network 66, in turn, directs the summed output to a low-pass filter 68. Low-pass filter 68 then feeds the filtered impulses to a first comparator 46' associated with the liquid filling system and to a second comparator 48' associated with the emptying system. The comparators 46' and 48', in turn, feed electrical impulses to a logic circuit 50' controlled by the tank selector and power switches 62' and an inhibit timer 64'. The logic circuit 50', in this embodiment, directly controls the respective raise, correct and lower indicators 54', 56' and 58'.

With reference now to FIG. 5, the operation of the embodiment illustrated in FIG. 4 will be explained. Pulses C and D are illustrated, respectively, in FIGS. 5a and 5b. As can be seen, FIG. 5 depicts three columns of tank-ship conditions. The first case is when the phase difference is 45°, the second is the case when the phase difference is 90°, and in the third, the phase difference is 135°. For purposes of discussion, 45° and 135° are considered to be respective phase differences which require filling and draining of the stabilizing tank. FIG. 5c illustrates the output of gate 34' of FIG. 4, and FIG. 5d illustrates the output of gate 38'. After the output of gate 38' is reversed in polarity by the polarity reversing circuit 70, the resultant signal takes the form illustrated by the pulses of FIG. 5e. When the respective output pulses of gate 34' (FIG. 5c) and polarity reversing circuit 70 (FIG. 5e) are added by sum or 66 and filtered by the low-pass filter 68, the result is the development of the signals indicated in FIG. 5f. At 145°, the average summed and filtered signal is positive, and the indicator lights show that the tank should be filled. At 90°, the average signal is zero, indicating that the tank is operating at its optimum condition. And at 135°, the summed and filtered signal is negative, and hence the indicator lights will display that the tank should be drained.

As already noted, the circuit of FIG. 4 differs from that illustrated in FIG. 1 in that the indicators continually monitor the operating conditions of the tank and ship, displaying an average condition after an initial time delay period. In this embodiment, it is important that the low-pass filter 68 have a very low cut-off frequency, so as to smooth and average the input signals. In this manner, it takes many periods before the output of the circuit reaches its average value, in this manner averaging a long period of phase displacement and preventing the display of transient conditions.

This invention provides for a phase sensing system for use with a ship stabilization apparatus whereby the phase difference between the movement of fluid within a stabilization tank and the roll of a ship is utilized to indicate the desired level of the fluid within the tank and to enable adjustment of the fluid level for providing optimum ship stabilization.

The invention in its broader aspects is not limited to the specific details shown and described, and departures may be made from such details without departing from the principles of the invention and without sacrificing its chief advantages. It is possible, for example, to apply the outputs of gates 34 and 38 to a low-pass filter. In this case, the output average voltage level will be directly proportional to the phase difference between the liquid transfer and the ship's motion. This information can then be applied to comparator circuitry for indicating relative liquid levels.

What is claimed is:

1. A system for use with a fluid-type ship stabilization tank for maintaining the operation of the stabilization tank near optimum conditions, said system comprising:

fluid sensing means operatively associated with said tank for sensing a characteristic related to the movement of fluid within said tank and for developing a signal indicative of fluid movement;

roll sensing means in operative relationship with said ship for sensing a characteristic related to the roll of the ship and for developing a signal indicative of ship roll;

comparator means operatively associated with said fluid sensing means and said roll sensing means for developing a signal indicative of the phase differential between the movement of fluid within the ship stabilization tank and the roll of the ship;

level indicator means in operative relationship with said comparator means for indicating whether the fluid level in the stabilization tank requires adjustment to maintain the desired condition of ship stabilization; and updating means for periodically updating said level indicator means with updating information in such a manner that transient conditions are not reflected in the updating information reaching said level indicator.

2. A system as in claim 1, wherein said updating means is in operative relationship with said level indicator means, and only periodically updates said indicator means after a predetermined number of increments of updating information.

3. A system as in claim 2, further comprising: logic means for receiving signals from said fluid sensing means and roll sensing means; and timing means for periodically returning said logic means to a predetermined starting condition.

4. A system as in claim 2, wherein said updating means includes: an update generator operatively connected to said roll sensor; counter means operatively connected to said update generator and said level indicator means for detecting the output signals from said update generator and for periodically issuing an output signal to said level indicator means to periodically enable updated information from said comparator means to be transmitted to said level indicator means.

5. A system as in claim 1, further comprising: shaping means and logic means intermediate said comparator means and the respective fluid sensing and roll sensing means for receiving the signals developed by said fluid sensing means and said roll sensing means, and for shaping the thus received signals and for transmitting the same to said comparator means.

6. A system as in claim 1, wherein said fluid sensing means comprises pressure sensors positioned beneath the surface of the fluid within said tank.

7. A system as in claim 6, wherein two pressure sensors are provided in said stabilization tank, and wherein one of said pressure sensors is positioned adjacent a first end of said tank and the other of said pressure sensors is positioned adjacent a second and opposite end of said tank.

8. A system as in claim 1, wherein said roll sensing means is a gyro-type sensor for directly detecting the roll of the ship.

9. A system as in claim 1, wherein said shaping means comprises: first amplifier means operatively connected to said fluid sensing means for receiving and amplifying output signals from said fluid sensing means and for issuing signals of predetermined characteristics as determined by the level of fluid in said tank; and second amplifier means operatively connected to said roll sensing means for receiving and amplifying output signals from said roll sensing means and for issuing signals of predetermined characteristics as determined by the roll of the ship.

10. A system as in claim 9, wherein said shaping means further comprises: first integrator means for receiving signals originating with said fluid sensing means; and second integrator means for receiving signals originating with said roll sensing means.

11. A system as in claim 10, wherein said logic means comprises: first control means operatively connected to said first integrator means for controlling the operation thereof; and second control means operatively connected to said second integrator means for controlling the operation thereof.

12. A system as in claim 11, wherein said shaping means further comprises: summing means opeatively connected to said first and second integrator means for receiving the output signals from said first and second integrator means and for developing a signal equal to the arithmetic sum thereof; and difference means operatively connected to said first and second integrator means for receiving the output signals from said first and second integrator means and for developing a signal equal to the arithmetic difference thereof.

13. A system as in claim 12, and further comprising: voltage divider means operatively connected to said summing means for receiving output signals therefrom and for issuing a signal which is a multiple of the summed outputs of said first and second integrator means.

14. A system as in claim 13, wherein said comparator means comprises: first and second comparator units operatively connected to said voltage divider means for comparing the difference between the outputs of said first and second integrator means with said multiple of the summed outputs of said first and second integrator means, and for issuing and transmitting to said indicator means, output signals indicative of the level of the desired fluid level in said stabilization tank.

15. A system as in claim 14, wherein said level indicator means includes: a logic circuit operatively connected to said first and second comparator units; memory means operatively connected to said logic circuit for storing information received from said first and second comparator means; and connector means for operatively connecting said level indicator means with said memory means for indicating information relative to the level of the fluid in the stabilization tank.

16. A system as in claim 10, and further comprising timing means including a dump generator for periodically returning said first and second integrator means to a predetermined condition.

17. A system as in claim 16, wherein the period for returning to said predetermined condition is determined by the roll period of the ship.

18. A system as in claim 1, wherein said comparator means includes a low-pass filter.

19. A system as in claim 1, wherein said fluid sensing means issues first signals indicative of the movement of fluid within said tank; wherein said roll-sensing means issues second signals indicative of the roll of the ship; and wherein said comparator means includes means for comparing the phase difference between said first and second signals and for issuing third signals indicative of the phase differences, and low-pass filter means for receiving said third signals and for averaging the same over multiple rolls of the ship, said low-pass filter means thereby controlling said level indicator means in accordance with the average relationship between the fluid movement and the ship over said multiple rolls of the ship.

* * * * *